US006167637B1

(12) United States Patent
Nagase et al.

(10) Patent No.: US 6,167,637 B1
(45) Date of Patent: Jan. 2, 2001

(54) DEHYDRATING METHOD AND HYDROEXTRACTOR

(75) Inventors: Yuuji Nagase, 21-11, Josai-3-chome, Nishi-ku, Nagoya-shi; Hyosuke Nagase, Nagoya; Kazuo Kobayashi, Chiba; Norio Masumoto, Ichinomiya, all of (JP)

(73) Assignees: Yuuji Nagase, Nagoya; Hitachi, Ltd., Tokyo, both of (JP)

( * ) Notice: Under 35 U.S.C. 154(b), the term of this patent shall be extended for 0 days.

(21) Appl. No.: 09/259,055

(22) Filed: Mar. 1, 1999

(30) Foreign Application Priority Data

Mar. 3, 1998 (JP) .................................................. 10-049916
Jan. 20, 1999 (JP) .................................................. 11-011628

(51) Int. Cl.[7] .................................................... F26B 7/00
(52) U.S. Cl. .................................. 34/388; 34/393; 34/398
(58) Field of Search .............................. 34/380, 381, 388, 34/391, 393, 398, 400, 415, 61, 62, 70, 95, 143, 202, 235; 100/116, 152, 156; 210/609, 770

(56) References Cited

U.S. PATENT DOCUMENTS

| 489,362 | * | 1/1893 | Bornholdt ........................... 34/388 X |
| 937,172 | * | 10/1909 | Pearson ................................. 34/70 X |
| 3,230,865 | * | 1/1966 | Hibbel et al. ........................ 100/116 |
| 3,872,695 | | 3/1975 | Busek . |
| 3,954,609 | * | 5/1976 | Purdey .................................... 210/54 |
| 4,186,089 | * | 1/1980 | Okada .................................... 210/39 |
| 4,237,618 | * | 12/1980 | Maffet .................................... 34/380 |
| 4,753,089 | | 6/1988 | Engel . |
| 4,827,853 | * | 5/1989 | Emery ................................. 34/208 X |
| 5,001,911 | | 3/1991 | Eck et al. . |
| 5,152,213 | | 10/1992 | Masumoto . |
| 5,160,440 | * | 11/1992 | Mérai ................................... 34/70 X |
| 5,377,423 | * | 1/1995 | Nagaoka .................................. 34/70 |
| 5,484,620 | * | 1/1996 | Oeschle et al. ....................... 426/422 |

* cited by examiner

Primary Examiner—Stephen Gravini
(74) Attorney, Agent, or Firm—Antonelli, Terry, Stout & Kraus, LLP

(57) ABSTRACT

The hydroextractor disclosed has a dehydration chamber, a pressurization chamber defined by a flexible diaphragm in isolation from the dehydration chamber, and a crushing member disposed in the dehydration chamber. A pipe member extends through the pressurization chamber and the diaphragm, and a rotary shaft extends sealingly through the pipe member into the dehydration chamber. The crushing member is mounted to the rotary shaft and is driven by a drive apparatus connected to the opposite end of the shaft. The hydroextractor feeds moist material and pours cooling water into the dehydration chamber and introduces pressurized water into the pressurization chamber. The hot material fed in the dehydration chamber is pressure-dehydrated into a cake with the diaphragm of the pressurization chamber. The dehydrated cake is poured with cooling water, and at the same time the crushing member crushes the dehydrated cake and mixes it with the cooling water. This agitation breaks films of coagulative substances formed in the dehydrated cake and provides passages for the residual water to be extracted, thereby increasing the dehydration rate and rapidly cooling the material.

9 Claims, 14 Drawing Sheets

(a)

(b)          (c)

DEHYDRATING METHOD AND HYDROEXTRACTOR

BACKGROUND OF THE INVENTION

The present invention relates to a method and an apparatus for pressure-dehydrating wet or moist materials. The method and apparatus of the invention are particularly suited for, but not exclusively, the processing of foods and medicines and are also applicable to the water extraction from sludge or other wastes.

The word "pressure-dehydrate" in this specification means squeezing of water by compression.

For dehydration of foods or other moist materials a method is available which simply applies pressure to the material. This method, based on a conventional principle that "dehydration depends on power", has placed importance on increasing the pressure at which to squeeze the material for higher dehydration efficiency.

With the conventional dehydration method based on pressurization only, however, the dehydration rate for food materials with large contents of water, such as bean jam, is limited to about 60%. A further increase in the pressure does not result in enhanced squeezing nor improved dehydration rate. For this reason, this dehydration rate is currently taken as a limit. If, however, the dehydration rate can be increased further, this will reduce the amount of energy required for drying the products after the dehydration process, making significant contributions to saving thermal energy such as oil and electricity.

Food materials such as bean jam are usually pressurized for dehydration while at elevated temperature immediately after being boiled.

When hot materials are processed as is, however, they remain hot even after undergoing dehydration. Because the food material after dehydration remains hot until it is cooled in a refrigerator or the temperature of the central portion of the lumped material is still high at an initial stage of cooling, putrefying bacteria can grow or the quality of the food material may change deteriorating its taste. Further, a large amount of electric energy is required to cool the hot material down to a predetermined temperature in the refrigerator, giving rise to a problem of increased manufacturing cost.

An example of the conventional hydroextractor is disclosed in U.S. Pat. No. 5,152,213. The hydroextractor of this U.S. patent is of a structure in which a pressure chamber is bounded by a diaphragm over a dehydration chamber to press material in the dehydration chamber by the diaphragm which is expanded by a fluid pressure.

SUMMARY OF THE INVENTION

The invention has an object of providing a dehydrating method capable of reducing energy and cost required to manufacture products.

Another object of the invention is to provide a hydroextractor capable of efficiently implementing the above method.

The present inventors have gropingly studied why 60% is the limit for the dehydration based only on pressurization and what is the obstacle to improving the dehydration rate. According to the result of our examination conducted by breaking open dehydrated cakes which were formed by pressurizing food materials such as bean jam, we have found that there are films of cohesive or coagulative substances, or films of crushed paste-like starch, in the cakes. It has been known from this that the pressurization of the material develops coagulative substance films among material particles, which in turn close and clog passages or escape paths for residual water in the material to hinder the dehydration process.

The invention therefore is intended to break the coagulative substance films to increase the dehydration rate. As for the problems associated with hot food materials, the invention aims at forcibly cooling the material as quickly as possible during the dehydration process to prevent growth of putrefying bacteria and deterioration of quality of the material.

The dehydrating method according to the invention involves crushing the material cake, which has been pressure-dehydrated once, and then dehydrating the crushed cake again by compression.

According to this method, when a material with a high water content, such as beam jam, is compressed, coagulative substance films clogging passages for the residual water develop in the dehydrated cake. Then, when the cake is crumbled, the films are destroyed to form water passages again in the cake. After this, when the crushed cake is again compressed, the residual water in the cake is squeezed out through the passages thus formed.

Hence, when the method of the invention is applied to such materials as beam jam which, during compression, will develop coagulative substance films in the dehydrated cake, the dehydration rate can be increased as compared with that achieved by a conventional method. It is therefore possible to reduce the amount of thermal energy required to heat and dry the dehydrated products, i.e., to reduce the consumption of fossil fuel and electricity, making great contributions to energy conservation. The time and cost required for drying can also be reduced. Furthermore, because the drying time is reduced, the quality degradation of the material can be prevented.

The above method preferably further includes a step of cooling the dehydrated cake while the cake is being crushed. With this, when the heated food material is dehydrated, the material is rapidly cooled at the same time, which can prevent degradation of food quality due to growth of putrefying bacteria and also prevent early deterioration of taste. Where the material is medicine, this method can prevent degradation of quality of nutrients such as vitamins.

It is also preferable that the first dehydration step, the crushing step and the second dehydration step be performed sequentially in one dehydration chamber. This improves the efficiency of the dehydrating operation.

In addition to the conventional constitutional elements, such as a dehydration chamber and means for dehydrating material by compression, the hydroextractor of the invention includes means for crushing the dehydrated cake in the dehydration chamber.

This apparatus can implement the above dehydrating method. Further, the apparatus can perform two dehydration and crushing consecutively in one dehydration chamber, thus improving the efficiency.

The crushing means may comprise rotary blades in the dehydration chamber or may be constructed to inject air for crushing the dehydrated cake. The former can directly contact the dehydrated cake to reliably crumble it, and the latter can perform two actions of cooling and crushing at the same time, thus improving also the problem associated with the high temperature of food materials.

Preferably, the dehydration means includes a pressurization chamber adapted to press a flexible diaphragm member against the material, the crushing means comprises a crushing member in the dehydration chamber and a rotary shaft for the crushing member, and a pipe member for letting the rotary shaft sealingly pass is provided through the center of the diaphragm member. Because the rotary shaft for the crushing member is inserted through but isolated from the pressurization chamber, it can easily and reliably rotate the crushing member in the dehydration chamber from outside the apparatus without being affected by the pressure of the pressurization chamber.

It is preferred that the rotary shaft of the crushing member be provided with injection ports from which to inject compressed air into the dehydration chamber. With this arrangement, the dehydrated cake is subjected not only to the direct contact of the crushing member but also to an air injection force and therefore crushed more finely. The injected air can also cool the dehydrated cake. This can further enhance the dehydration rate and deal with the problems associated with hot materials.

The pipe member is preferably movable to extend into the dehydration chamber as the diaphragm member expands, and receive a side of the expanded portion of the diaphragm member. Because the pipe member receives or supports the expanded portion as the diaphragm member expands, it is possible to prevent a situation that the diaphragm member gets entangled with the rotary shaft of the crushing member and causes a malfunction.

Further, a screening or filter cloth for passage of water extracted from the material is preferably provided. It is also preferred to provide the dehydration chamber and the pressurization chamber in one chamber-defining body and to set the filter cloth and the chamber-defining body movable. The filter cloth and the chamber-defining body are brought into contact with each other to close the dehydration chamber, and after the dehydration operation, the chamber-defining body is raised from the filter cloth to expose the dehydrated cake. Then, the filter cloth is moved to carry the dehydrated cake out of the apparatus. With this arrangement, the dehydration operation and the taking of the dehydrated cake out of the apparatus can be performed consecutively, allowing a large amount of material to be processed automatically and efficiently.

In this case, it is preferred that the end wall of the chamber-defining body facing the filter cloth be tapered so that the dehydration chamber broadens outwardly at its lower portion. Further, the chamber-defining body and the rotary shaft of the crushing member are preferably linked through time delay means so that, when the chamber-defining body is lifted, only the chamber-defining body rises first and, then, moves the rotary shaft upwardly together. When taking-out the dehydrated cake, even if it fits strongly to the inner lower surface of the chamber-defining body, only the chamber-defining body moves up, with the crushing member blocking the upward movement of the dehydrated cake. This causes the dehydrated cake to come off the chamber-defining body. The taper surface of the end wall of the chamber-defining body facilitates the separation. Then, the crushing member moves up together with the chamber-defining body, allowing the dehydrated cake to break by its own weight from the crushing member and fall onto the filter cloth. Thus, the dehydrated cake can be taken out easily and reliably.

The dehydrating method according to another aspect of the invention pours cooling water over the material cake, which has been pressure-dehydrated once, and then dehydrates again by compression the cake to which the cooling water has been added.

According to this method, when a hot material is dehydrated, hot water is extracted from the material. Subsequently, by adding cooling water to the material and then compressing it again, the cooling water is forced through the cake and extracted therefrom. Heat inside the material is thereby forcibly carried out of the material by the cooling water. Accordingly, when this method is applied to the dehydration of a boiled food material such as bean jam, the cooling water directly contacts the interior of the material and thereby cools it quickly. This in turn prevents the growth of putrefying bacteria in the food material at an early stage and therefore prevents the early degradation of quality or taste of the material. Where the material is medicine, it is possible to prevent deterioration of nutrients such as vitamins.

The above method preferably further comprises a step of crushing the dehydrated cake. The crushing step may be either at the same time with the cooling water pouring step or after the pouring step.

As described above, the compression of a food material such as bean jam produces coagulative substance films in the dehydrated cake that hinder dehydration. Crushing the dehydrated cake, however, can form water passages again, thereby allowing the residual water and the cooling water in the material to be squeezed out satisfactorily. In addition, because the crushing operation agitates and mixes the material and the cooling water, the material as a whole can be cooled more efficiently.

It is preferred to put the material in one dehydration chamber and perform the steps of dehydrating twice and the step of pouring the cooling water of the above method in this dehydration chamber. This enables a series of operations to be executed consecutively and efficiently with high level of cleanliness without exposing the material to the outside air.

The hydroextractor according to still another aspect of the invention comprises means for injecting or pouring cooling water into the dehydration chamber, in addition to the conventional constitutional elements such as a dehydration chamber and means for dehydrating material by compression.

This apparatus can implement the method described above. In addition, it can perform the two dehydration and the cooling water injection consecutively in one dehydration chamber, and the operations are therefore efficient and clean.

The apparatus preferably further comprises means for crushing the dehydrated cake in the dehydration chamber. With this means it is possible to break coagulative substance films that have developed in the dehydrated cake of a food material, and to improve the dehydration rate and promote the agitation and mixing of the material and the cooling water, thus enhancing the cooling effect.

BRIEF DESCRIPTION OF THE DRAWINGS

The above and other features and advantages of the present invention will become more apparent from the detailed description which will be made with reference to the embodiments shown in the accompanying drawings, in which:

FIGS. 7(a)–(b) show a crushing member in the first embodiment of the invention, in which FIG. 7(a) is a side view, FIG. 7(b) is a section view taken along the line VIIb—VIIb of FIG. 7(a), and FIG. 7(b) is a section view taken along the line VIIc—VIIc of FIG. 7(a);

DESCRIPTION OF THE PREFERRED EMBODIMENTS

The present invention will be described in conjunction with the embodiments shown in the accompanying drawings. FIGS. 1 through 13 represent the first embodiment of the invention.

Figure 1:
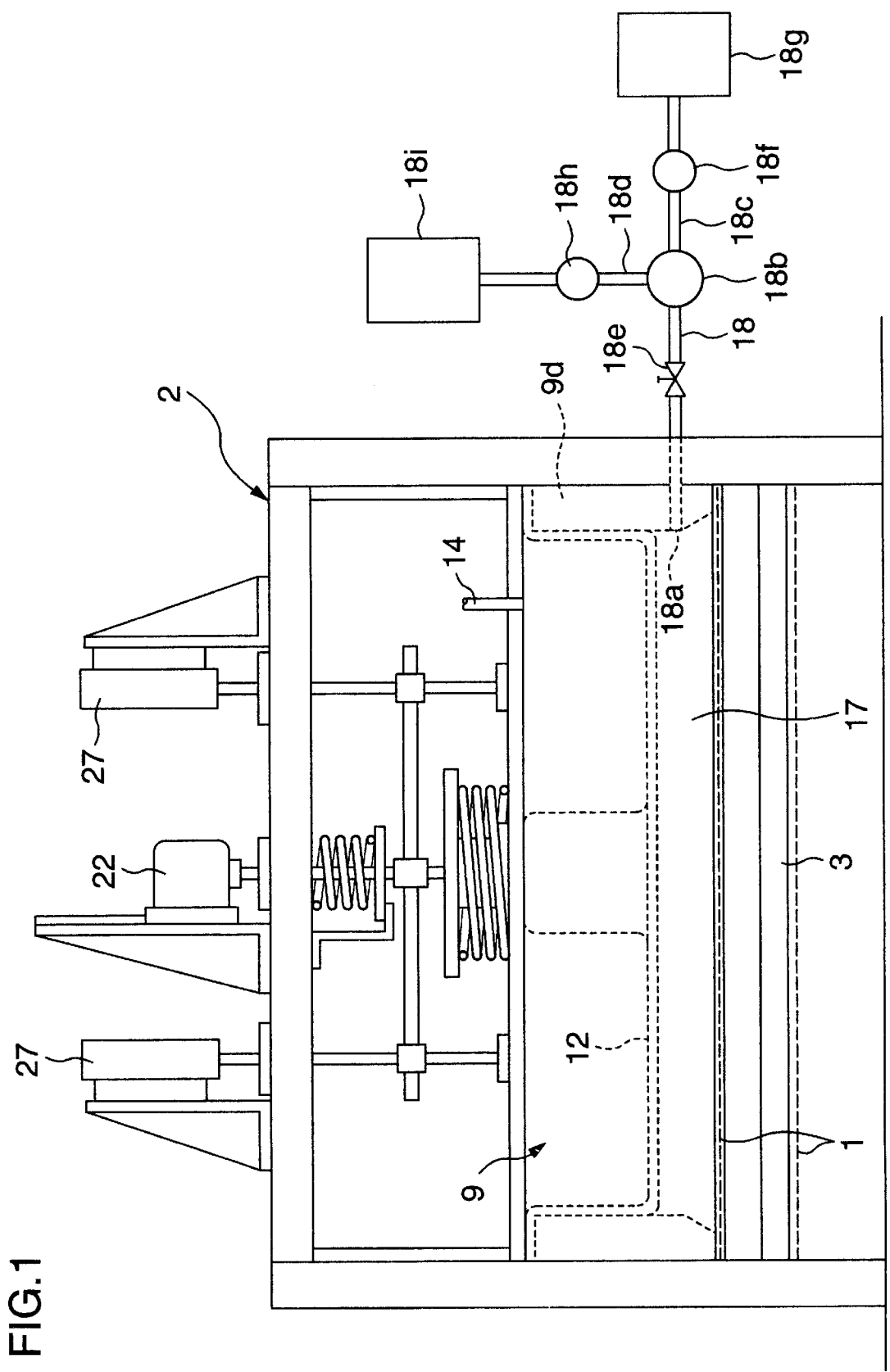
FIG. 1 is a front view showing a hydroextractor according to the first embodiment of the invention.
Figure 2:
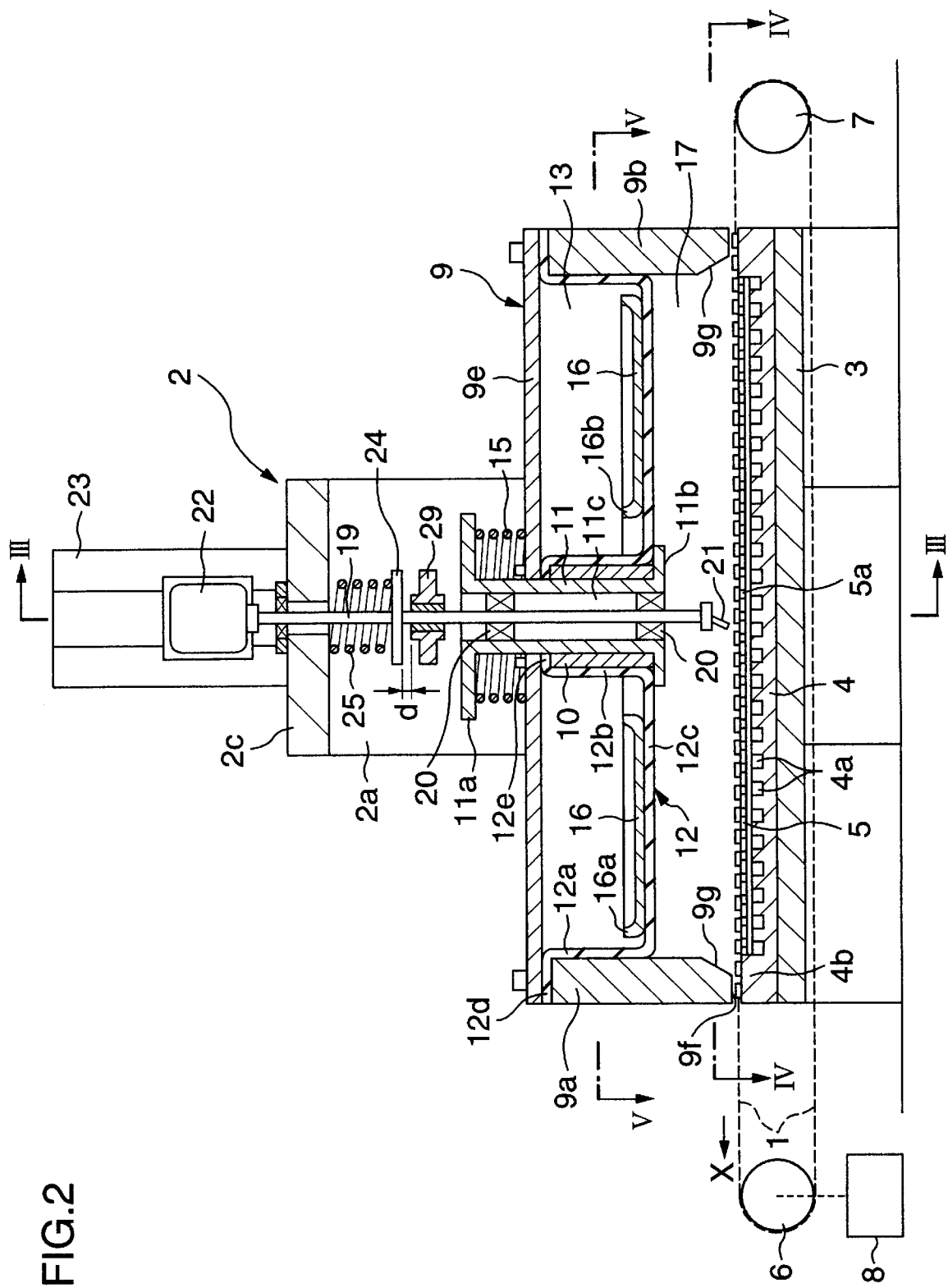
FIG. 2 is a sectional side view of FIG. 1.
Figure 3:
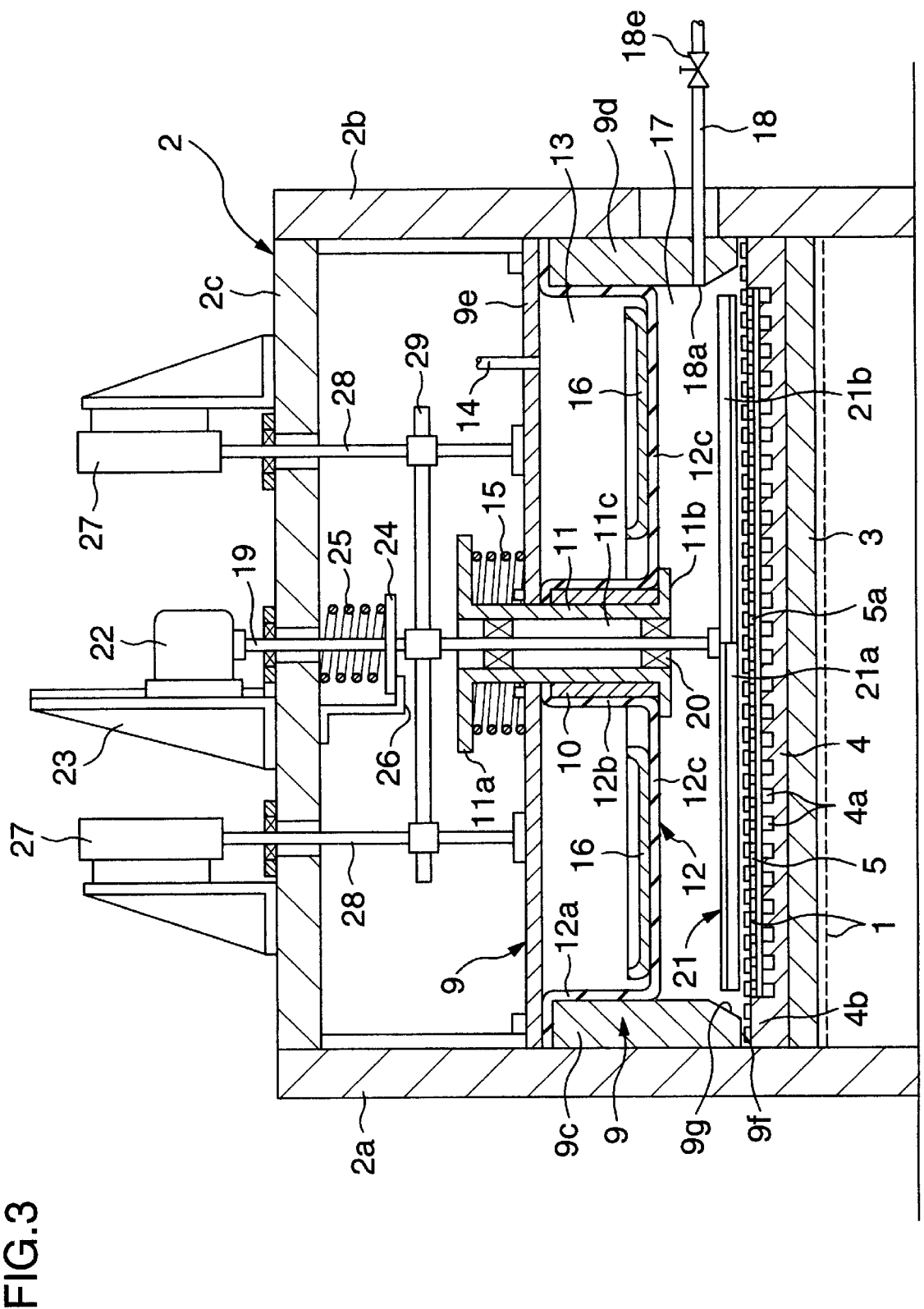
FIG. 3 is a sectional front view taken along the line III—III of FIG. 2.
Figure 4:
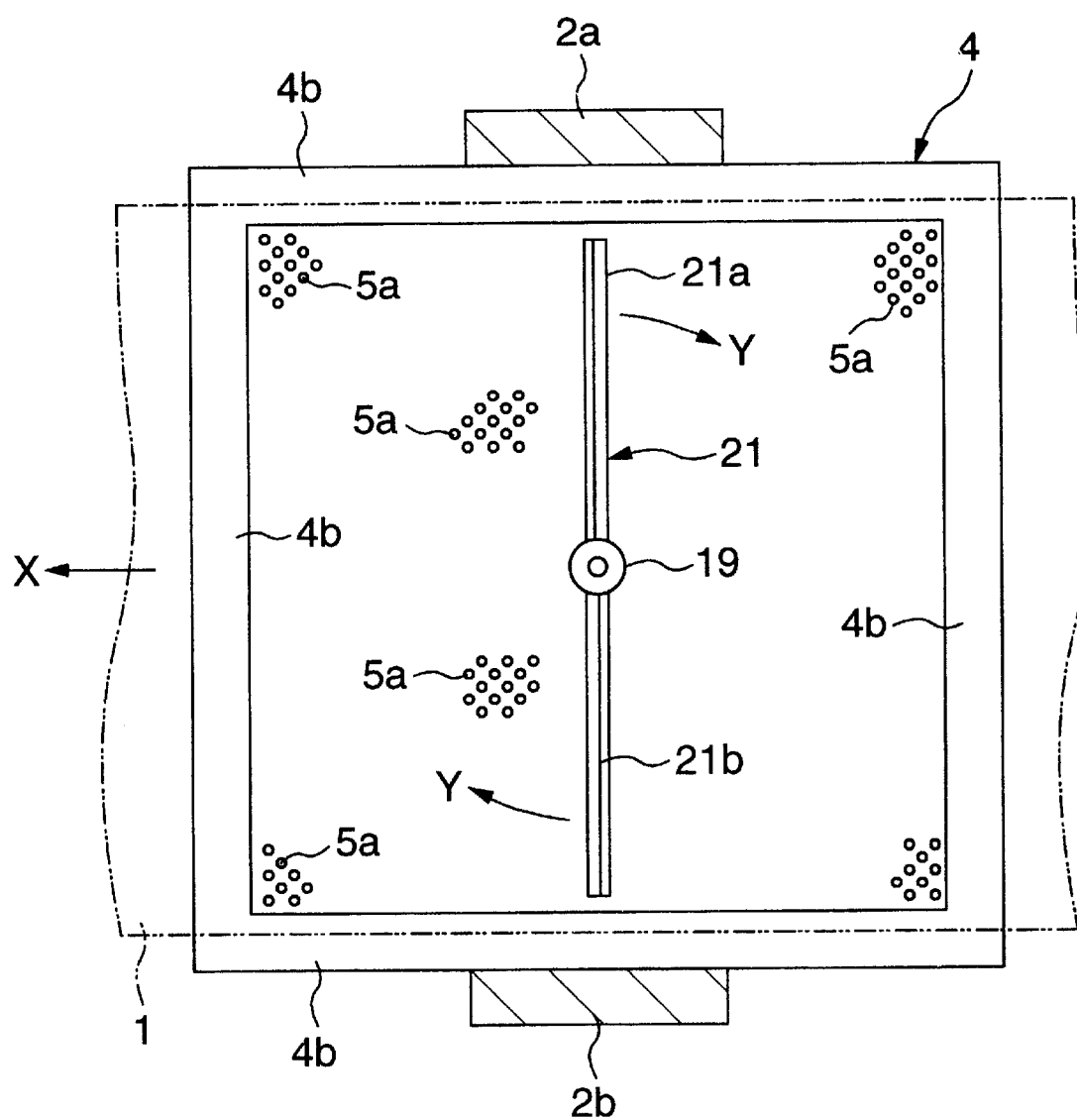
FIG. 4 is a section view taken along the line IV—IV of FIG. 2.
Figure 5:
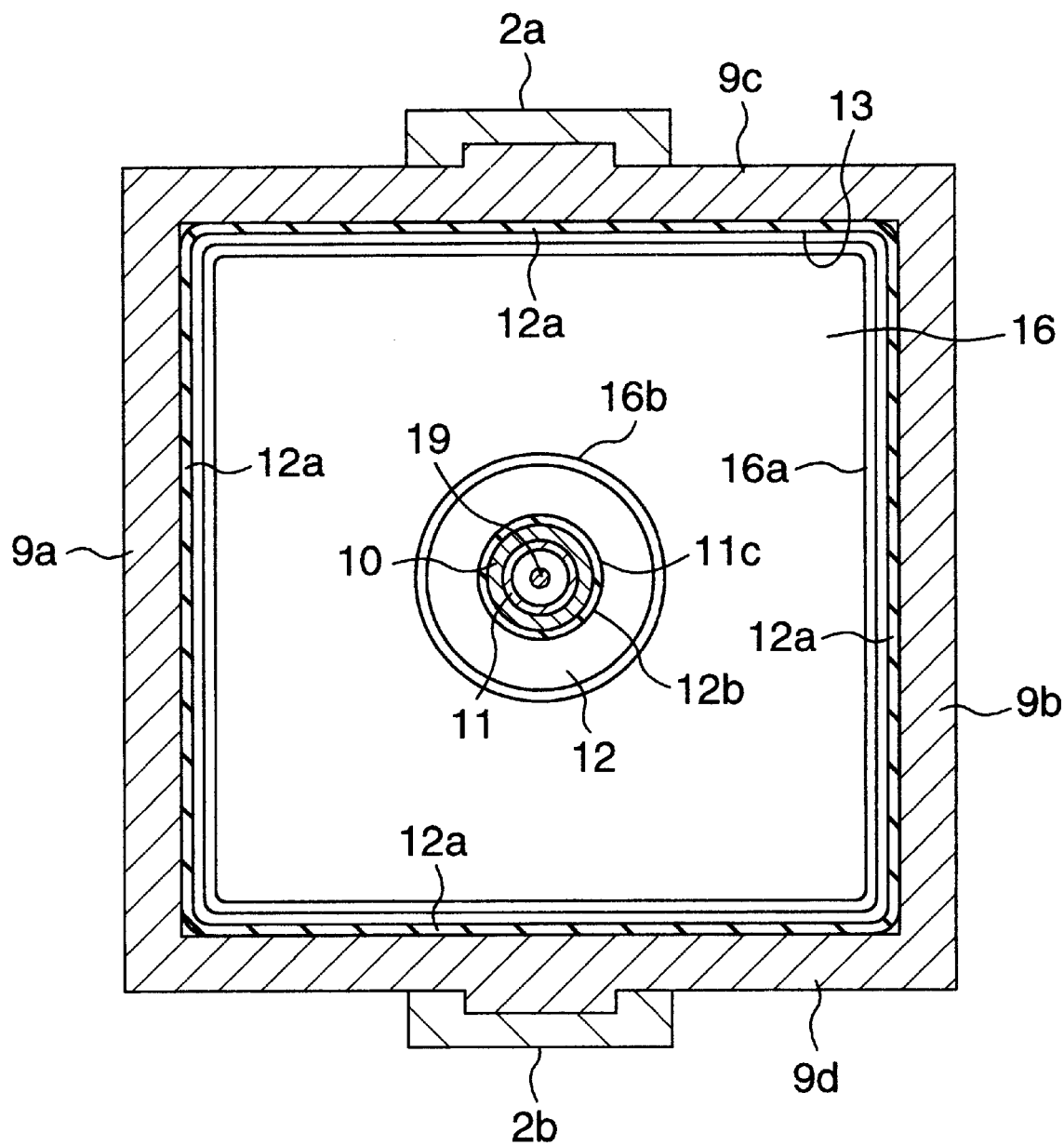
FIG. 5 is a section view taken along the line V—V of FIG. 2.
Figure 6:
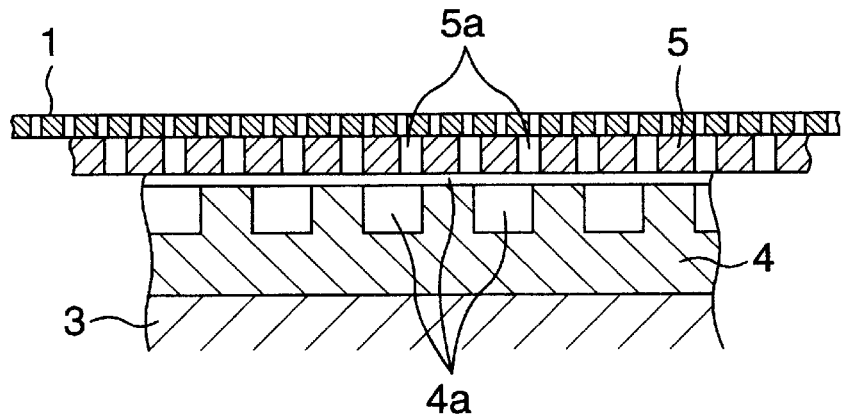
FIG. 6 is an enlarged, fragmentary section view of a filter cloth, a porous plate and a drain plate in the first embodiment of the invention.
Figure 7:
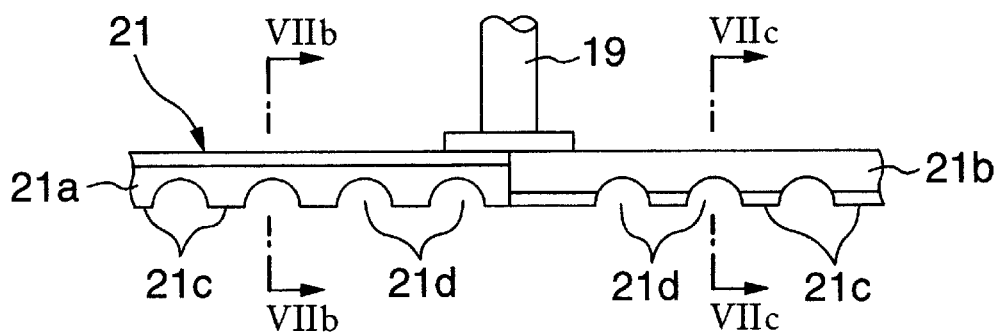
Figure 7:
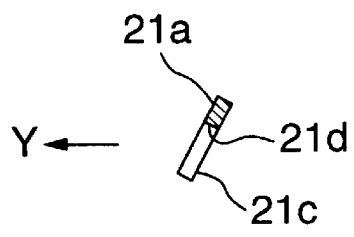
Figure 7:
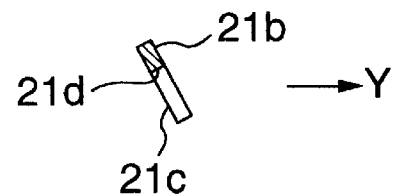

FIG. 1 is a front view as viewed in a direction perpendicular to the direction in which a screening or filter cloth is moved. FIG. 2 is a sectional side view taken in the direction of movement of the filter cloth. FIG. 3 is a section view taken perpendicularly to the direction of movement of the filter cloth or along the line III—III of FIG. 2. FIG. 4 is a section view taken along the line IV—IV of FIG. 2. FIG. 5 is a sectional view taken along the line V—V of FIG. 2.

In FIGS. 1 to 5, an arch-like stationary frame 2 is provided to extend perpendicularly to a direction X in which the filter cloth 1 moves. In a lower part of the space between legs 2a, 2b of the stationary frame 2, a base plate 3 which is square in a horizontal plane is fixedly installed horizontally.

Securely mounted on the base plate 3 is a drain plate 4 which is formed with drain grooves 4a in the upper surface thereof. The drain grooves 4a are connected with a drainage passage, not shown, to discharge water that has flowed into the drain grooves 4a out of the apparatus. The drain plate 4 is formed square in a horizontal plane as shown in FIG. 4.

Further, on the upper surface of the drain plate 4 is fixedly mounted a porous plate 5 having a large number of drain holes 5a, which is made, for example, of a punching plate. As shown in FIG. 4, the porous plate 5 is formed in a square shape smaller than the drain plate 4, and a flat blocking surface 4b is formed along the circumference of the drain plate 4. The filter cloth 1 is mounted movable over this porous plate 5. The drain plate 4, the porous plate 5 and the filter cloth 1 are shown in an enlarged scale in FIG. 6.

The filter cloth 1, as shown in FIG. 2, is formed endless and wound around a drive roller 6 and a driven roller 7 and is driven by an electric motor 8 serving as driving means in the direction of arrow X over a required distance to discharge the cake.

A chamber-defining body 9, which has a circumferential wall comprising front and rear walls 9a, 9b and side walls 9c, 9d and a top plate 9e with its bottom open, is disposed over the filter cloth 1. The outer surfaces of the side walls 9c, 9d of the chamber-defining body 9 are, as shown in FIGS. 3 and 5, supported vertically slidable on the inner surfaces of the legs 2a, 2b of the stationary frame 2 so that the chamber-defining body 9 can be raised or lowered. Further, The circumferential wall 9a–9d is square in plan view like the drain plate 4. A flat closing surface 9f, i.e., a bottom surface of the circumferential wall 9a–9d, is adapted to fall in alignment with the blocking surface 4b of the drain plate 4. The inner surface of the lower part of the circumferential wall 9a–9d is formed with a tapered surface 9g that expands outwardly toward the bottom.

In the central part of the chamber-defining body 9 a cylindrical guide pipe 10 is vertically disposed, with its upper end secured to the top plate 9e. Inside the guide pipe 10 a vertically moving pipe 11 is fitted slidably and extends through the guide pipe 10 and the top plate 9e, which has an engagement flange 11b projecting horizontally at the lower end thereof. The guide pipe 10 and the vertically moving pipe 11 together serve as a pipe member that isolates a pressurization chamber 13, which will be described later, from a shaft insertion portion 11c of the vertically moving pipe 11.

In a space enclosed by the circumferential wall 9a–9d, the top plate 9e and the guide pipe 10, a diaphragm 12 made of a flexible member such as rubber is installed. The diaphragm 12 is shaped like a bottomed cylinder with an open top, which comprises an outer cylinder portion 12a extending along the inner surface of the circumferential wall 9a–9d, an inner cylinder portion 12b extending along the outer surface of the guide pipe 10, and a bottom portion 12c. The diaphragm 12 further has an outer circumferential flange portion 12d and an inner circumferential flange portion 12e, both of which are integrally formed with the upper ends thereof. The outer circumferential flange portion 12d is interposed between the circumferential wall 9a–9d and the top plate 9e, which are fastened together with, for example, bolts to securely hold the outer circumferential flange portion 12d in a watertight manner. The inner circumferential flange portion 12e is interposed between the guide pipe 10 and the top plate 9e, which are tightened together with bolts to securely hold the inner circumferential flange portion 12e in a watertight manner. The space enclosed by the diaphragm 12 and the top plate 9e constitutes the pressurization chamber 13.

The pressurization chamber 13 is connected with an injection passage 14 for pressurized water, through which the pressurized water delivered from a pressurized water supply source (e.g., pressure pump), not shown, is introduced into the pressurization chamber 13.

The vertically moving pipe 11 has a flange 11a at its upper end, and a spring 15 as bias means is compressedly interposed between the flange 11a and the top plate 9e to urge the vertically moving pipe 11 upward at all times.

A press plate 16 is placed on the bottom portion 12c of the diaphragm 12. The press plate 16 has its outer circumference formed in a square shape close in size to the outer cylinder portion 12a of the diaphragm 12 and its inner circumference formed in a circular shape larger than the outer diameter of the engagement flange 11b, as shown in FIG. 5. The press plate can be separated from the bottom portion 12c of the diaphragm 12. Further, its inner circumferential portion 16a and outer circumferential portion 16b are bent roundedly upward.

The space defined by the inner surface of the circumferential wall 9a–9d of the chamber-defining body 9 and the upper surface of the filter cloth 1 forms a dehydration chamber 17, the volume of which decreases as the bottom portion 12c of the diaphragm 12 expands downwardly and increases as it contracts upwardly. In a normal condition where the pressurization chamber 13 is not pressurized, the engagement flange 11b of the vertically moving pipe 11 is brought into contact with the lower end of the guide pipe 10 by the bias means 15, as shown in FIG. 2.

Figure 10:
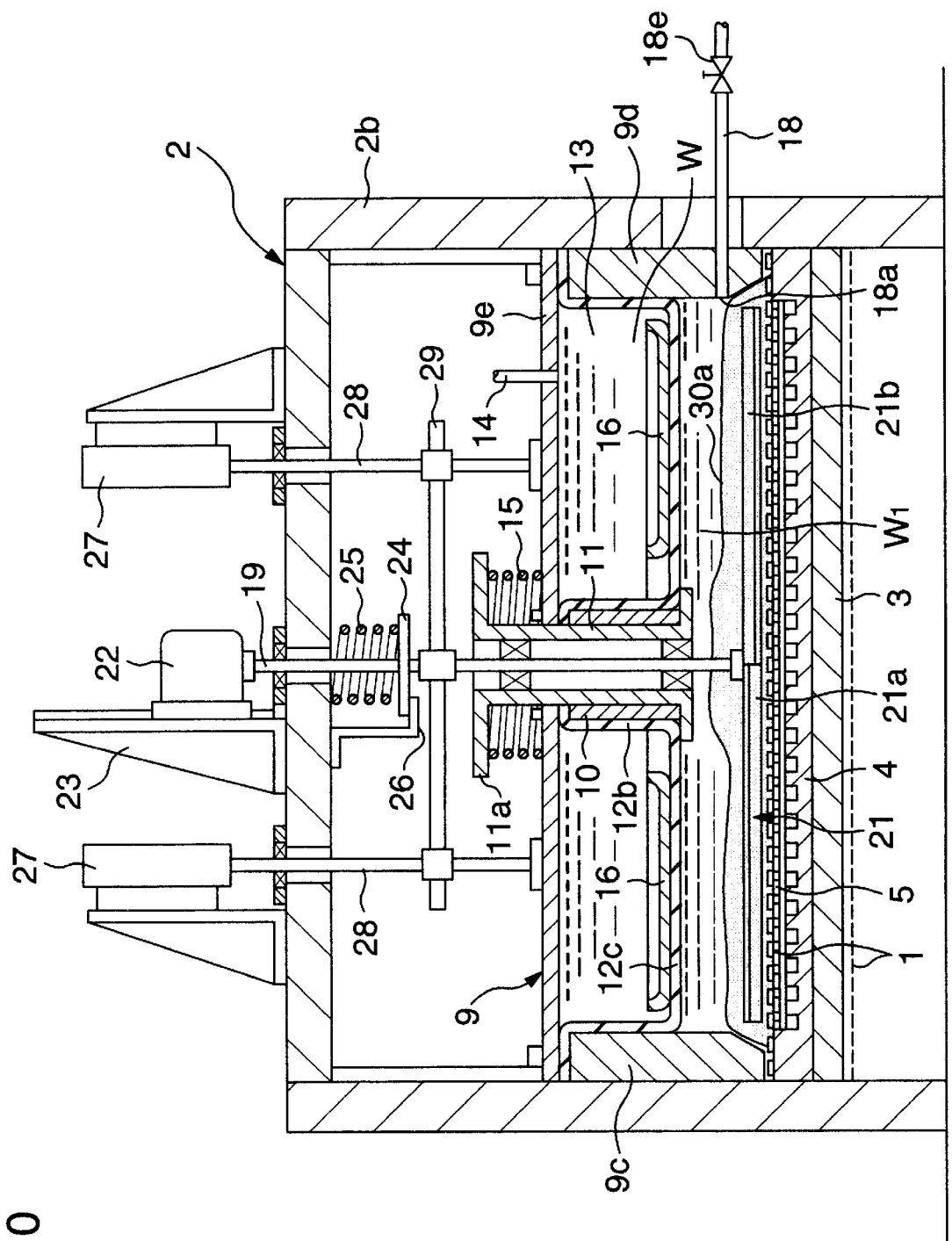
FIG. 10 is a sectional front view showing the hydroextractor which from the state of FIG. 9 has reduced the pressure in the pressurization chamber to stop the compression of a first-dehydrated cake and at the same time poured cooling water.

The circumferential wall 9d, as shown in FIGS. 1 and 3, is connected with an injection passage 18 in the form of a pipe, which opens and communicates to the dehydration chamber 17. An open end portion 18a of the injection passage 18 opens into the dehydration chamber 17 at a position above the upper surface of a pressure-dehydrated, caked material 30a, as shown in FIG. 10.

The upstream side of the injection passage 18 is connected through a selector valve 18b to a material injection passage 18c and a cooling water injection passage 18d. The injection passage 18 is further provided with a cock 18e. The cock 18e may be replaced with a check valve that allows a flow toward the dehydration chamber 17 but prevents a flow in the reverse direction.

The upstream side of the material injection passage 18c is connected through a delivery pump 18f to a material tank 18g. The delivery pump 18f and the material tank 18g together form a material supply source.

The upstream side of the cooling water injection passage 18d is connected via a delivery pump 18h to a cooling water tank 18i. The delivery pump 18h and the cooling water tank 18i together form a cooling water supply source. The cooling water tank 18i stores cooling water at a temperature of about 3–5° C.

A rotary shaft 19 is coaxially inserted through the shaft insertion portion 11c defined by the vertically moving pipe 11. Bearings 20 that also serve as sealing members are secured to the inner circumferential surface of the vertically moving pipe 11 in such a manner that they can axially and circumferentially slide watertight on the outer circumferential surface of the rotary shaft 19. The bearings 20 support the rotary shaft 19 so that it can rotate and move vertically.

A crushing member 21 is horizontally secured to the lower end of the rotary shaft 19 so that it is located in the lower part of the dehydration chamber 17, or within the pressure-dehydrated cake. The crushing member 21 has two comb-shaped blades 21a, 21b radially projecting from the rotary shaft 19, as shown in FIG. 7(a). Further, the blades 21a, 21b are formed with raised and recessed portions 21c, 21d such that when the blades 21a, 21b are rotated about the rotary shaft 19, the rotating loci of the raised portions 21c of one blade 21a trace those of the recessed portions 21d of the other blade 21b and the rotating loci of the recessed portions 21d of the one blade 21a follow those of the raised portions 21c of the other blade 21b. Further, as shown in FIGS. 7(b) and 7(c), the blades 21a, 21b are inclined with their upper portions set back so that the blades can scoop the material as they turn in the direction Y.

The crushing member 21 is in the form capable of crumbling the dehydrated cake into pieces of a desired size according to the kind of material and may use other than the agitating blades of the embodiment, such as plates or bars. It is also possible to use only one blade on one side of the rotary shaft 19 or two or more blades in a radial configuration.

The upper end of the rotary shaft 19 is coupled with an electric motor 22 as rotary drive means for driving the rotary shaft 19. The electric motor 22 is supported vertically movable on a guide support member 23, which is erected on a beam 2c of the stationary frame 2, so that the electric motor 22 can move up or down together with the rotary shaft 19.

The rotary shaft 19 has an engagement flange 24 secured to the upper portion thereof, and a spring 25 as bias means is compressedly interposed between the engagement flange 24 and the beam 2c to urge the rotary shaft 19 along with the crushing member 21 downwardly at all times. The beam 2c has a stopper 26 securely attached thereto that engages the lower surface of the engagement flange 24. The arrangement is such that with the abutment of the engagement flange 24 against the stopper 26, the crushing member 21 is kept at a position slightly above the filter cloth 1, i.e., within the pressure-dehydrated cake.

The beam 2c also has two hydraulic cylinders 27 mounted thereon as vertical motion drive means, with their piston rods 28, 28 connected to the top plate 9e of the chamber-defining body 9. The hydraulic cylinders 27, 27 drive the chamber-defining body 9 vertically by a desired distance.

A vertically moving bar 29 bridges the piston rods 28, 28 and secured thereto, through the central part of which the rotating shaft 19 passes vertically movable via a bearing.

The vertically moving bar 29 is situated below the engagement flange 24 and, with the crushing member 21 at the lowest position, there is provided a predetermined gap d between the vertically moving bar 29 and the engagement flange 24 and this serves as time delay means.

Description will be now made of the method for dehydrating material into a cake with the above apparatus in the case where the material is bean jam with high water contents.

Figure 8:
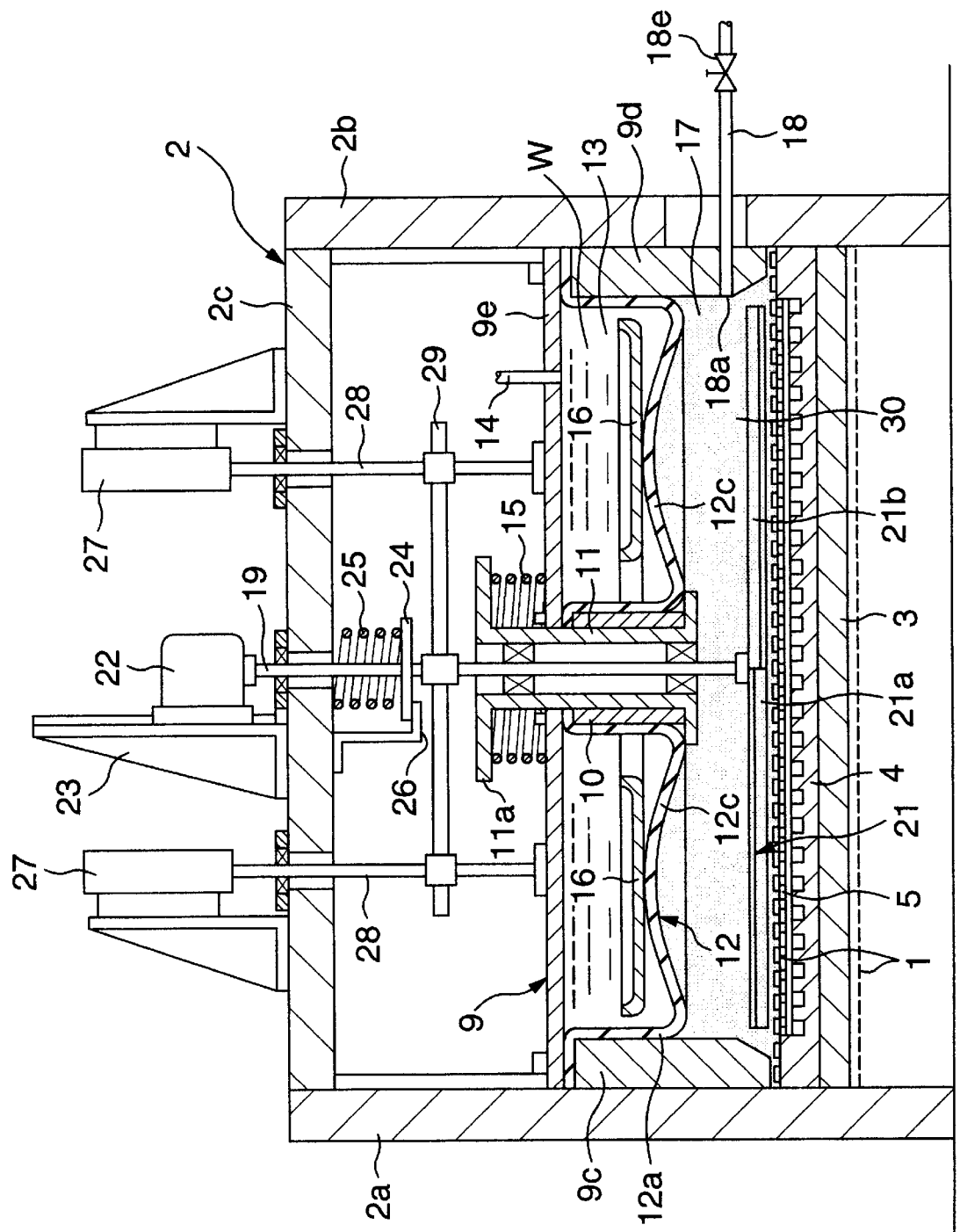
FIG. 8 is a sectional front view showing the hydroextractor which from the state of FIG. 3 is filled with material.

First, as shown in FIGS. 1 to 3, the chamber-defining body 9 is lowered to the lowest position, and the blocking surface 9f of its lower end presses against the blocking surface 4b of the drain plate 4 through the filter cloth 1. With the pressurization chamber 13 not yet pressurized and with the dehydration chamber 17 not yet supplied with the material, the cock 18e is opened, the selector valve 18b is switched to make the injection passage 18 communicate with the material injection passage 18c and to isolate the former from the cooling water injection passage 18d, and the delivery pump 18f is operated to feed the material (bean jam), which contains a large amount of water and is hot, from the material tank 18g into the dehydration chamber 17 under a predetermined pressure through the injection passage 18 and the cock 18e. The material 30 is filled in the dehydration chamber 17 until the bottom portion 12c of the diaphragm 12 extends a predetermined amount and expands upwardly as shown in FIG. 8. Then the cock 18e is closed. The press plate 16 at this time is lifted by the diaphragm 12 as shown in FIG. 8.

Figure 9:
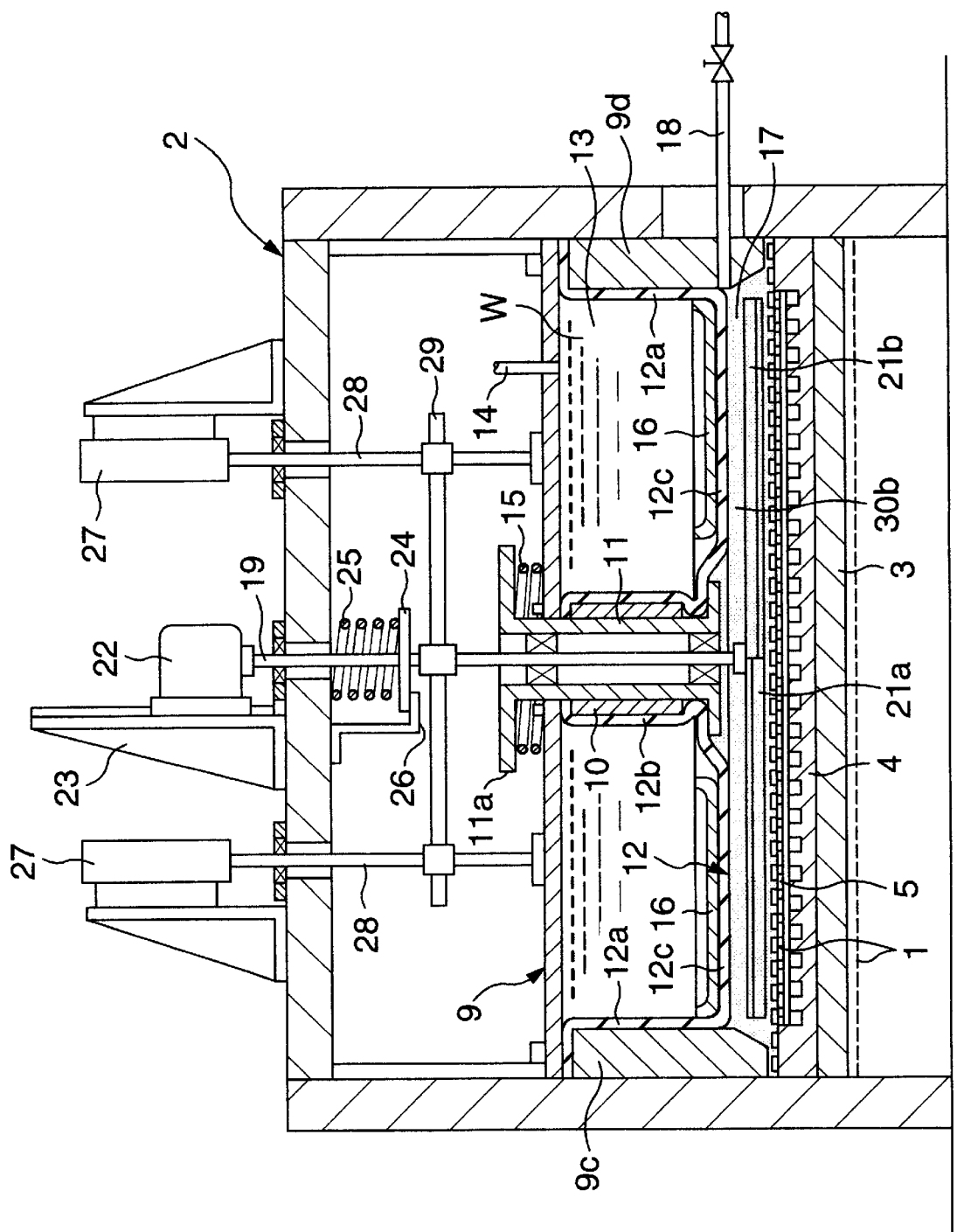
FIG. 9 is a sectional front view showing the hydroextractor which from the state of FIG. 8 has performed the first compression of the material by introducing pressurized water into a pressurization chamber.

Next, as shown in FIG. 9, high pressure water W is injected into the pressurization chamber 13 through the injection passage 14. When water has already been introduced into the pressurization chamber 13, the water is pressurized to a predetermined pressure. This injection or raising of pressure causes the high water pressure to act on the bottom portion 12c of the diaphragm 12 and, because of the presence of the press plate 16, the bottom portion 12c is kept almost flat while being expanded downwardly to compress the material 30.

During this pressurization, the bottom portion 12c is deformed, beginning with the upward expansion as shown in FIG. 8 and shifting to the normal horizontal state of FIG. 2 and then to the expansion slightly more downward than the horizontal state. That is, the first deformation of the diaphragm 12, which is almost half of the total deformation, is through an upward expansion, and the remaining half of the deformation is through a downward expansion. Thus, the amount of deformation or elongation of the bottom portion 12c from the non-pressurized state required to compress the dehydration chamber 17 by the same volume is smaller than when the bottom portion 12c is expanded only downwardly from the normal horizontal state of FIG. 2. It is therefore possible to increase the compression force while reducing the amount of expansion and contraction of the diaphragm 12, which in turn leads to an improved durability of the diaphragm 12.

Because the diaphragm 12 is integrally formed with the vertically elongate outer cylinder portion 12a and inner cylinder portion 12b, it is possible to increase the vertical elongation or contraction of the diaphragm 12 as a whole thanks to the elongation and contraction of these cylinder portions, contributing to enhancing the durability of the diaphragm 12.

The pressurization causes the vertically moving pipe 11 to move down against the biassing force of the spring 15 as shown in FIG. 9, which facilitates the downward expansion of the diaphragm 12 and at the same time prevents the inner cylinder portion 12b of the diaphragm 12, which has elongated below the guide pipe 10, from getting entangled with the rotary shaft 19.

As the bottom portion 12c of the diaphragm 12 is expanded downwardly as described above, the material 30 is pressurized and compressed to squeeze the water contained in the material 30 (its juice) through gaps among particles or small pieces of the material and the extracted water then flows through the filter cloth 1 and the porous plate 5 out into the drain grooves 4a of the drain plate 4, from which it is discharged through the drainage passage not shown. The material 30 after undergoing this dehydration process becomes a first-dehydrated cake 30a.

During this pressurization, because the pressurization chamber 13 is hermetically sealed by the diaphragm 12 and because the guide pipe 10 and the vertically moving pipe 11 form a pressure receiving portion for the inner be cylinder portion 12b of the diaphragm 12, the interior of the vertically moving pipe 11 provides a space as the shaft insertion portion 11c that is not affected by the pressure of the highly pressurized water. Thus, the rotary shaft 19 can be installed inside and extend through the vertically moving pipe 11.

After the first dehydration, the water pressure in the pressurization chamber 13 is lowered. As a result, the diaphragm 12 contracts by its own recovering force, lifting its bottom portion 12c as shown in FIG. 10, and the vertically moving pipe 11 is also raised by the biassing force of the spring 15 as shown in FIG. 10, so that the volume of the dehydration chamber 17 expands from the pressurized state, relieving the first-dehydrated cake 30a of the pressure.

Next, the selector valve 18b is operated to connect the injection passage 18 to the cooling water injection passage 18d and to disconnect the former from the material injection passage 18c. The cock 18e is opened and the delivery pump 18h is operated to deliver the cooling water from the cooling water tank 18i through the injection passage 18 and the cock 18e into the dehydration chamber 17. The injection of the cooling water $W_1$ may utilize the free fall by setting the cooling water tank 18i higher than the dehydration chamber 17, instead of using the delivery pump 18h.

The cooling water thus poured into the dehydration chamber 17 stays over the first-dehydrated cake 30a as indicated with $W_1$ in FIG. 10. Then the cock 18e is closed. Subsequently, the electric motor 22 is operated to rotate the rotary shaft 19 and the crushing member 21 in one direction, for example, in the direction of arrow Y in FIG. 4.

As the crushing member 21 is rotated within the first-dehydrated cake 30a, the first-dehydrated cake 30a is agitated and easily crumbles into small pieces, reducing the density of the cake. At the same time, films of coagulative substances formed in the cake during the pressurization is fractured to form gaps again among the particles of the first-dehydrated cake 30a, which gaps provide passages for water, and the first-dehydrated cake 30a inflates increasing the dehydration area. Further, the cooling water $W_1$ poured is agitated and mixed with the cake 30a, thus rapidly cooling the entire cake 30a. After the crushing member 21 has been rotated a predetermined number of times, the electric motor 22 is stopped to terminate the crushing process.

Figure 11:
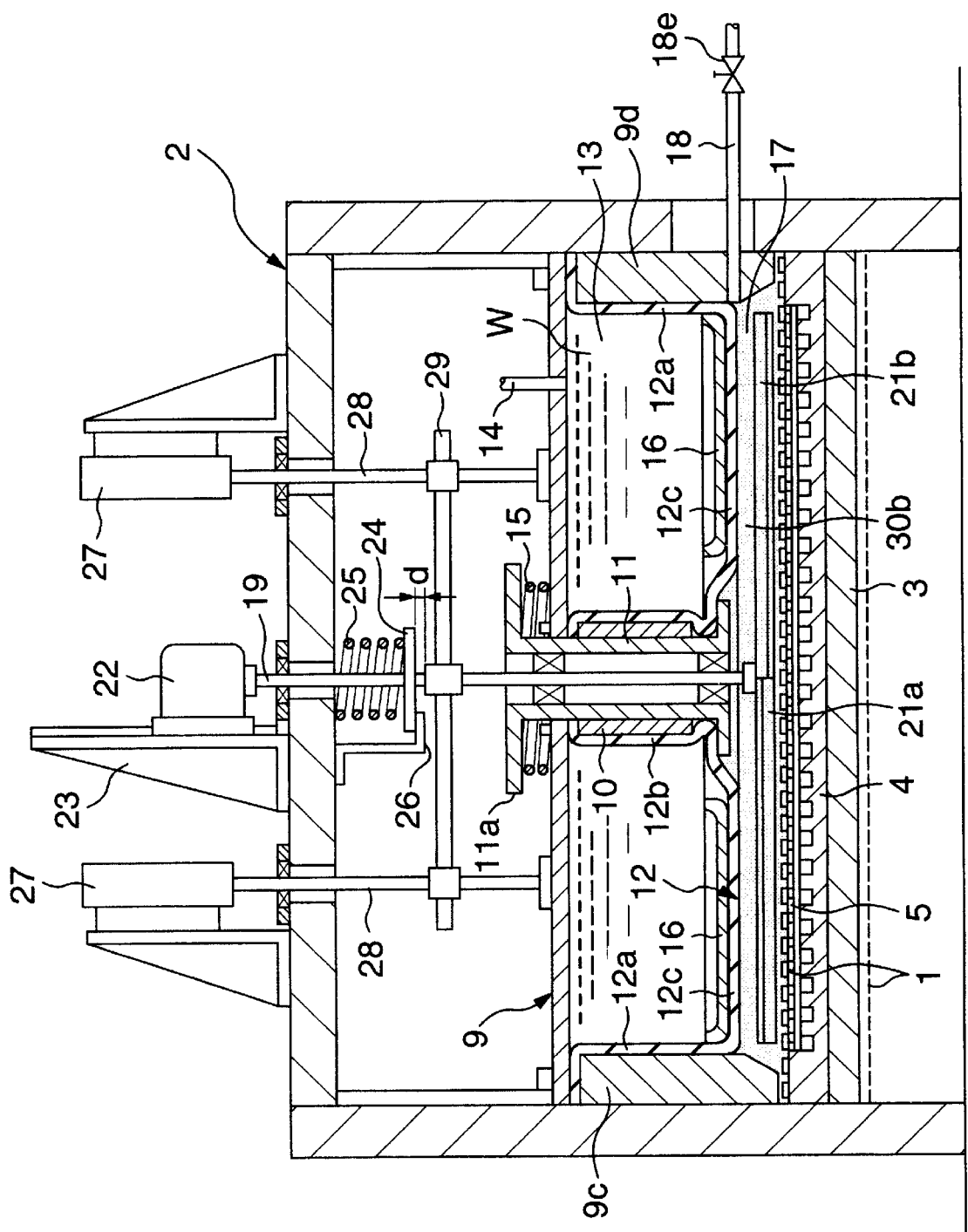
FIG. 11 is a sectional front view showing the hydroextractor which from the state of FIG. 10 has increased the pressure in the pressurization chamber again to perform the second compression of the first-dehydrated cake.

After this crushing process is completed, the high pressure water is again injected into the pressurization chamber 13 to raise the pressure of the pressurization chamber 13. As in the state shown in FIG. 9, this pressurization causes the bottom portion 12c of the diaphragm 12 to expand downward as shown in FIG. 11 to pressurize and compress the crumbled first-dehydrated cake 30a and the cooling water $W_1$ again. This compression easily squeezes the residual water in the first-dehydrated cake 30a and the heat-exchanged cooling water $W_1$ out through the gaps among the crumbled cake particles, and the extracted water is discharged through the filter cloth 1, the porous plate 5 and the drain plate 4 in the same manner as described in the first dehydration process. With this second dehydration process, the material is compressed into a second-dehydrated cake 30b which is more dehydrated and solidified than the cake produced by the first dehydration process.

After the second dehydration process, the pressure in the pressurization chamber 13 is reduced to allow the bottom portion 12c of the diaphragm 12 to rise again. With the pressure reduced, the vertically moving pipe 11 is also raised by the biassing force of the spring 15.

Figure 12:
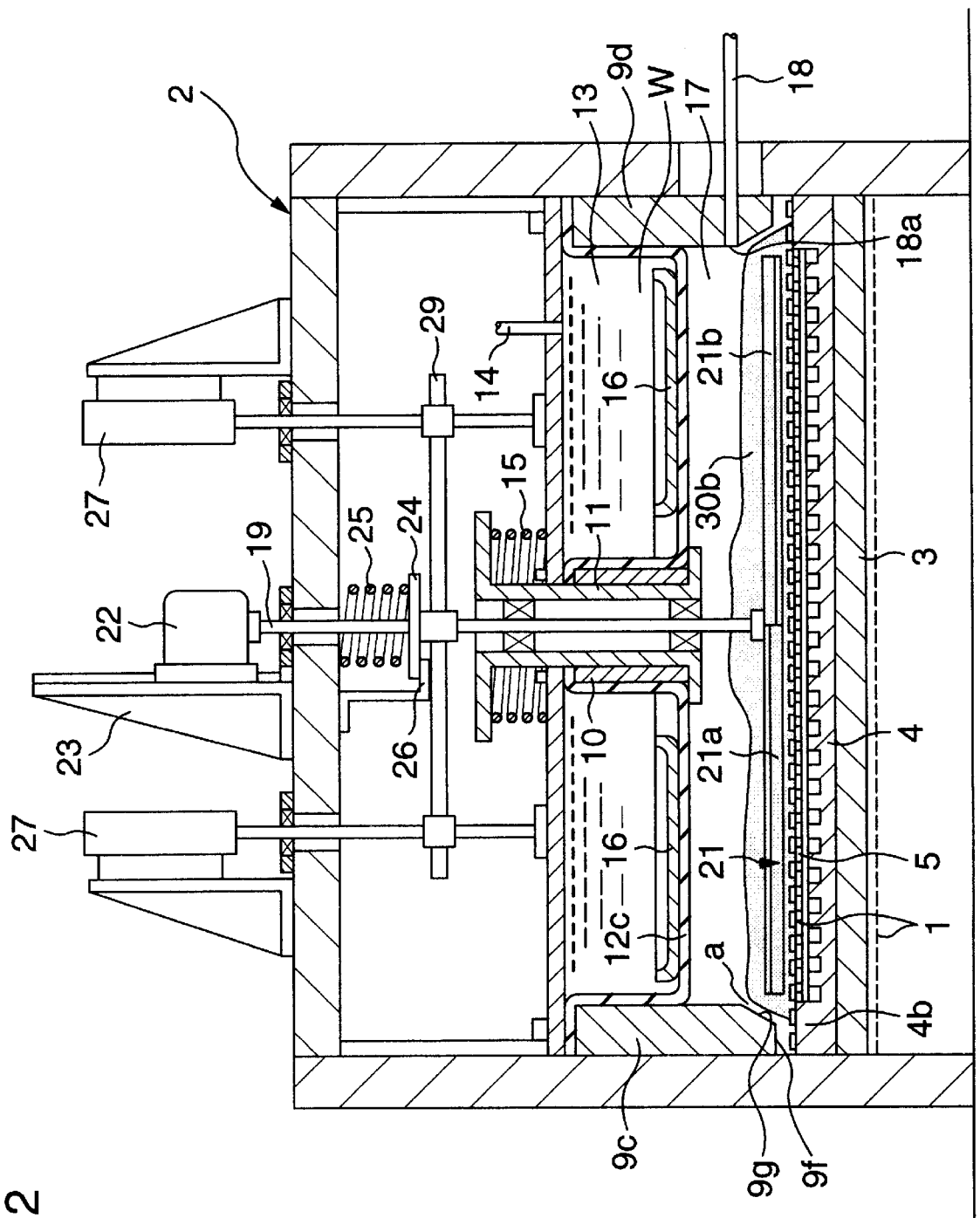
FIG. 12 is a sectional front view showing the hydroextractor which from the state of FIG. 11 has stopped the compression of the second-dehydrated cake and slightly raised a chamber-defining body.

After this pressure reduction, the hydraulic cylinders 27 are operated to move up their piston rods 28 to lift the chamber-defining body 9. At this time, as shown in FIG. 11, because there is the gap d between the engagement flange 24 and the vertically moving bar 29, the rotary shaft 19 does not move up from the state shown in FIG. 11, but only the chamber-defining body 9 moves up first. Only when the chamber-defining body 9 has moved up the distance d shown in FIG. 11, does the vertically moving bar 29 contact the underside of the engagement flange 24 secured to the rotary shaft 19 as shown in FIG. 12. During the upward movement of the chamber-defining body 9 over the distance d, the lifting of the second-dehydrated cake 30b along with the rising circumferential wall 9a–9d is prevented because the crushing member 21 in the lumped second-dehydrated cake 30b is not lifted, because the weight of the second-dehydrated cake 30b itself restrains the upward motion of the second-dehydrated cake 30b, and because the circumferential wall is formed with the tapered surface 9g. This will be explained in more detail. The second-dehydrated cake 30b by the second dehydration is solidified with a higher density than that of the first-dehydrated cake 30a. Accordingly, the circumferential surface of the second-dehydrated cake 30b fits strongly to the inner surface of the circumferential wall 9a–9d. Hence, unless some measure is taken, the second-dehydrated cake 30b will be lifted together with the circumferential wall 9a–9d while fitting thereto and cannot be taken out of the apparatus.

Because of the time delay means provided by the above gap d, however, the circumferential wall 9a–9d and the crushing member 21 are lifted with a time difference between them. Thus, with the second-dehydrated cake 30b prevented from moving up by its own weight and by the presence of the crushing member 21, only the circumferential wall 9a–9d is first moved up to securely separate itself from the second-dehydrated cake 30b with the aid of the tapered surface 9g formed on the lower inner surface of the circumferential wall 9a–9d. As a result, the tapered surface 9g of the circumferential wall 9a–9d lifts and parts from the second-dehydrated cake 30b by a gap a.

Figure 13:
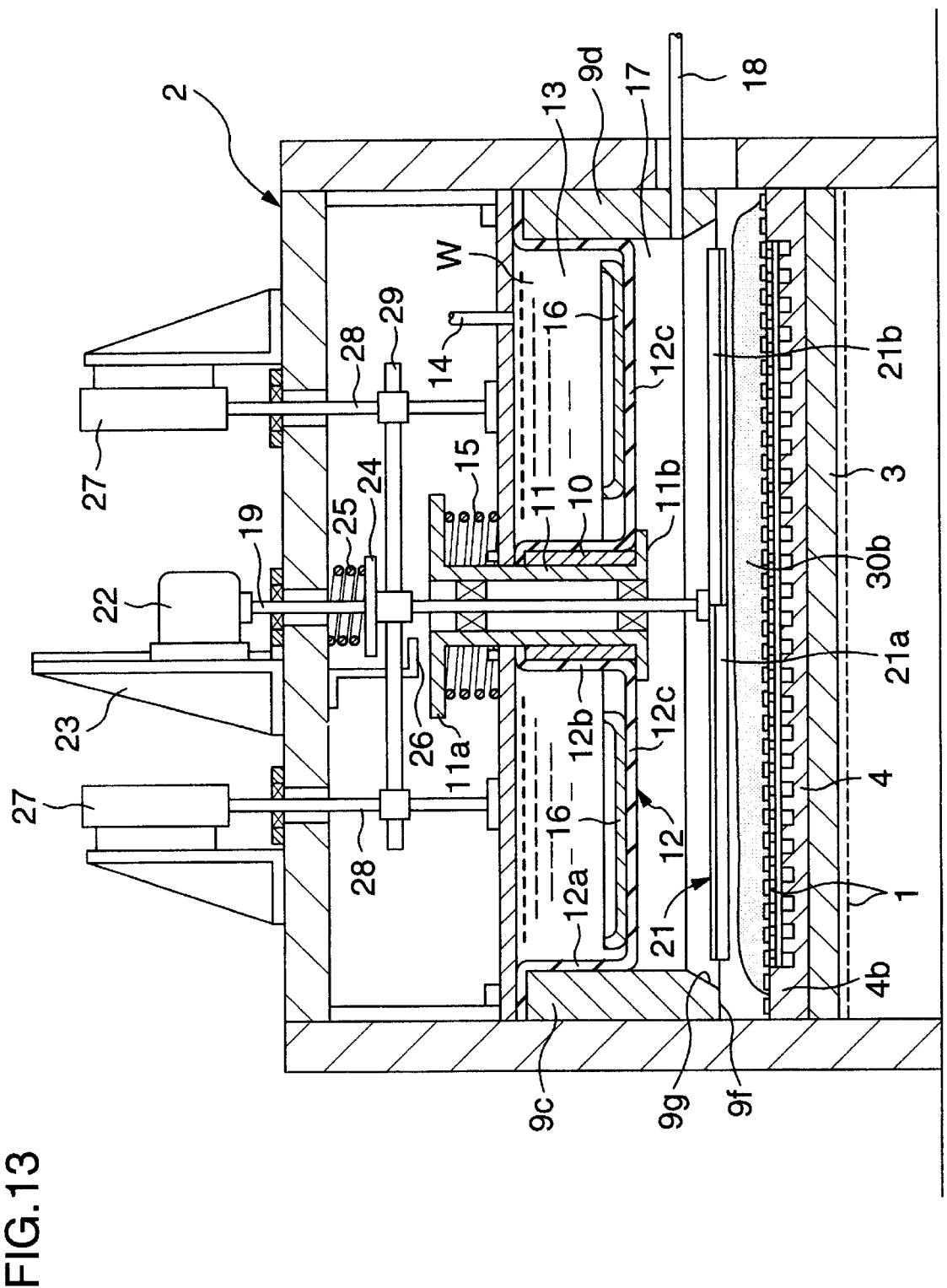
FIG. 13 is a sectional front view showing the hydroextractor which from the state of FIG. 12 has further raised the chamber-defining body to allow the second-dehydrated cake to be carried out of the apparatus.

As the chamber-defining body 9 rises further, the vertically moving bar 29 pushes up the engagement flange 24 against the spring 25 to move the crushing member 21 up, as shown in FIG. 13. Because the crushing member 21 is located at the central part of the second-dehydrated cake 30b, the upward motion of the crushing member 21 causes the second-dehydrated cake 30b to break in half along the crushing member 21 by its own weight. The broken cake thus remaining on the filter cloth 1 is then taken out of the dehydration chamber 17.

When the blocking surface 9f of the circumferential wall 9a–9d of the chamber-defining body 9 and the crushing member 21 rise above the upper surface of the second-dehydrated cake 30b, the hydraulic cylinders 27 are stopped. Then, the electric motor 8 is operated to drive the filter cloth 1 in the direction of arrow X in FIG. 2 to carry the second-dehydrated cake 30b out of the apparatus.

After the second-dehydrated cake has been taken out, the hydraulic cylinders 27 are operated to lower the chamber-defining body 9 and, at the same time, the rotary shaft 19 is lowered by the force of the spring 25 to return to the state of FIG. 2. Then, the processes described above are repeated to transform a large amount of material stored in the material tank 18g into the second-dehydrated cakes while cooling them.

The above processes are performed a required number of times. It is possible to perform a second cooling water injection process, a second crushing process, and a third pressure-dehydration process after the above second pressure-dehydration process is carried out.

Although the above embodiment includes a sequence of steps of performing the first pressure-dehydration after material is fed, releasing the pressure, pouring cooling water, crushing the dehydrated cake, and performing the second pressure-dehydration in that order, it is possible to omit the cooling water pouring step and to hydroextract material by performing the first pressure-dehydration on the material after the material is fed, releasing the pressure, crushing the dehydrated case, and then performing the second pressure-dehydration.

Even when the cooling water is not injected, by releasing compression after the first pressure-dehydration and then crushing the dehydrated cake, films of coagulative substances formed in the cake during the first pressure-dehydration are broken to form water passages in the cake, so that the second pressure-dehydration can further squeeze the residual water in the first-dehydrated cake, enhancing the dehydration rate.

Further, although the above embodiment crushes the cake after the cooling water has been injected and then performs the second dehydration, it is possible to omit the cake crushing step. That is, the processing may be executed in the following sequence of feeding material into the dehydration chamber 17 (feeding step), pressurizing the material to dehydrate it for the first time (first dehydration step), releasing the pressure, pouring the cooling water $W_1$ into the dehydration chamber 17 (cooling water pouring step), and then pressurizing the cake again to dehydrate it for the second time (second dehydration step).

In this way, even if the cake crushing step is omitted, the cake can be cooled rapidly inside because the cooling water $W_1$ is forced through the cake 30a during the second dehydration to transfer the heat of the first-dehydrated cake 30a to the cooling water $W_1$.

Further, although the above embodiment crushes the cake after the cooling water is poured, it is possible to crush the cake at the same time when the cooling water is poured. This allows the cooling water injection and the cake crushing to be performed simultaneously, thereby shortening the time of the dehydration operation and enhancing the efficiency.

Figure 14:
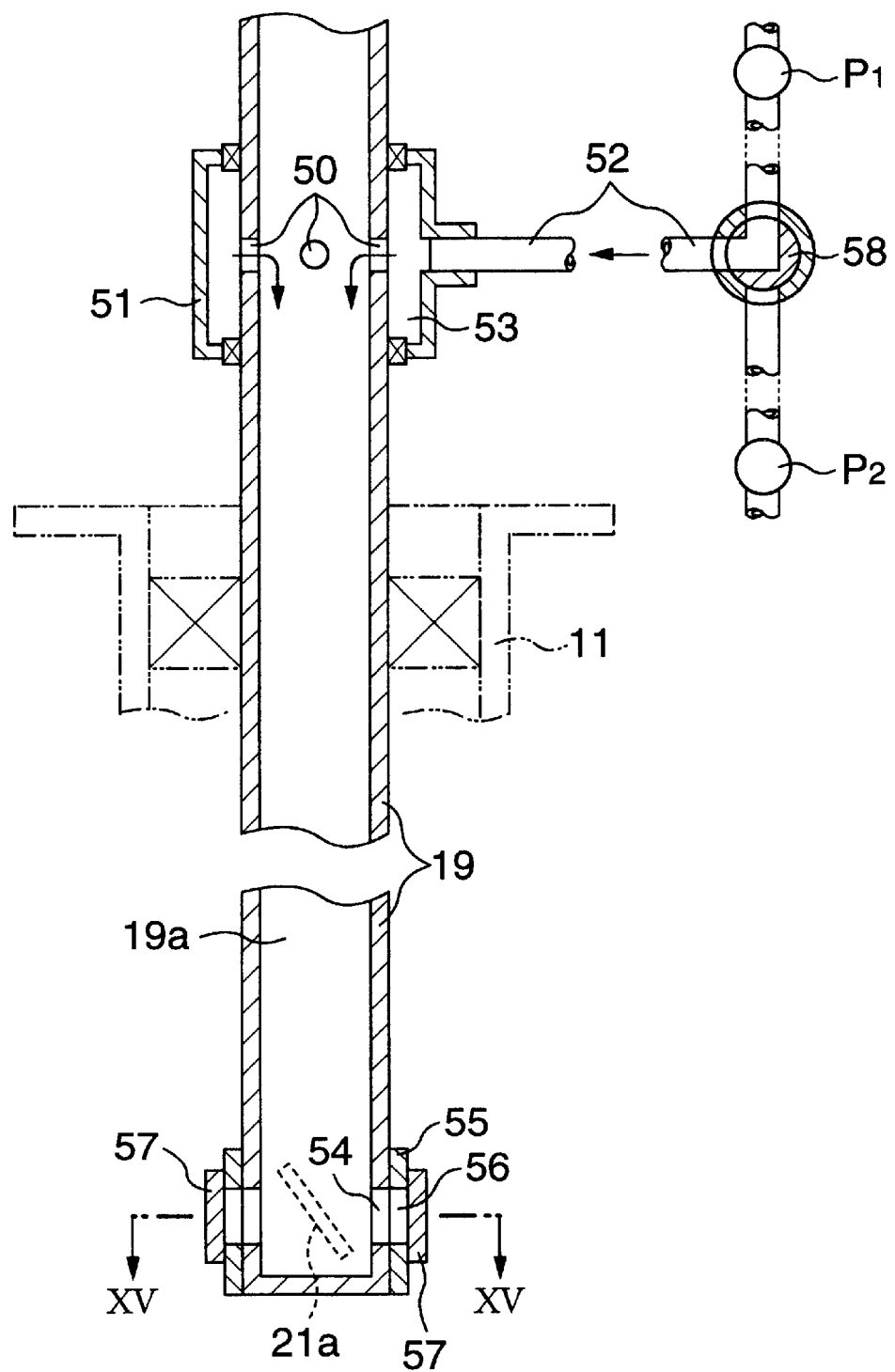
FIG. 14 is a sectional side view of an air injector in the second embodiment of the invention.
Figure 15:
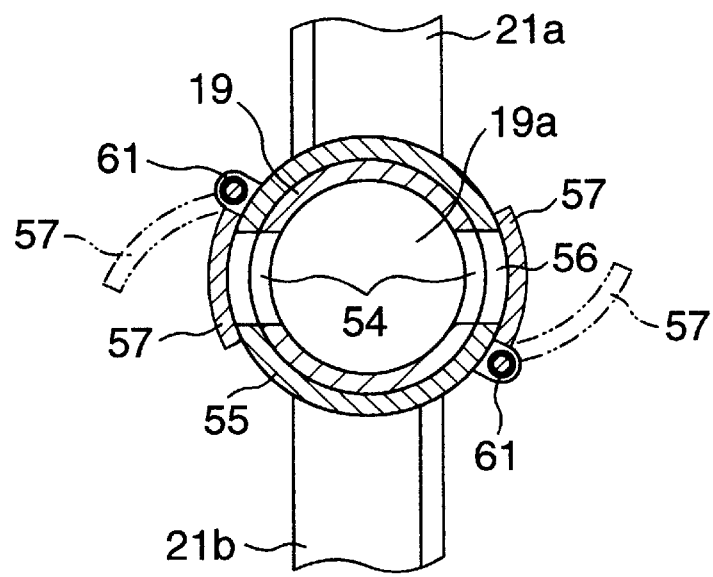
FIG. 15 is a sectional top view of a check valve in FIG. 14.
Figure 16:
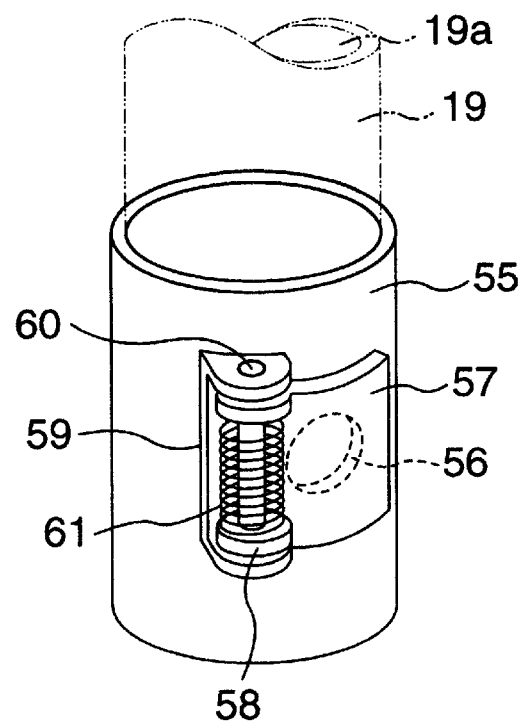
FIG. 16 is a perspective view of the check valve.

FIGS. 14 and 16 represent the second embodiment. In the second embodiment, the rotary shaft 19 of the first embodiment is provided with an air injection device for injecting air laterally from a lower part of the shaft to fracture the dehydrated cake and with a cleaning device for injecting cleaning water.

More specifically, the rotary shaft 19 is constructed of a hollow pipe and has air introducing ports 50 formed in the upper portion thereof which protrudes from the vertically moving pipe 11. An enclosure wall 51 is hermetically mounted on the outer circumference of the rotary shaft 19 where the air introducing ports 50 are provided, in such a manner as to allow rotation of the rotary shaft 19. Compressed air is supplied from air supply means P1 (e.g., air pump) through a three-way valve 58 and an air introducing pipe 52 into an air introducing chamber 53, from which the air is further introduced through the air introducing ports 50 into a passage 19a in the rotary shaft 19.

A part of the rotary shaft 19 that is located within the dehydrated cake 30a, which has been pressure-dehydrated into a lump as is in the first embodiment, is formed with a required number of air injection ports 54. In the second embodiment, these air injection ports 54 are located at the base portion on which the blades 21a, 21b are attached and between the blades 21a, 21b that form the crushing member 21 as described on the first embodiment. The number and position of the air injection ports 54 are not limited to those illustrated in the figures but can be set arbitrarily. Further, a cylinder 55 is secured to the outer circumference of the shaft 19 at the air injection ports 54 and has air injection ports 56 communicating with the air injection ports 54. The cylinder 55 is provided with check valves 57 that open and close the air injection ports 56. The check valves 57 have their arms rotatably mounted on vertical support shafts 60 of brackets 59 secured to the cylinder 55. Normally, the check valves 57 close the air injection ports 56 by the force of return springs 61 wound around the vertical support shafts 60. When the compressed air is introduced into the passage 19a inside the rotary shaft 19, the pressure of the compressed air opens the check valves 57 against the force of the return springs 61 to let the compressed air jet from the air injection ports 56 into the dehydration chamber 17.

The rotary shaft 19 with the above air injection means is installed in such a hydroextractor as described on the first embodiment in a way similar to the first embodiment.

Now, the operation of the second embodiment will be described.

During the first dehydration, which has been detailed in the first embodiment, the check valves 57 are closed by the applied pressure to prevent the material from entering the air injection ports 56. Then, after the first dehydration is over, when the pressure on the first-dehydrated cake 30a is released and the rotary shaft 19 is rotated to drive the crushing member 21, the three-way valve 58 is operated to a position shown in FIG. 14 to supply compressed air from the air supply means $P_1$ into the air introducing pipe 52.

The compressed air thus supplied flows through the air introducing chamber 53, the air introducing ports 50, the passage 19a and the air injection ports 54 to the air injection ports 56, where the pressure of the compressed air opens the check valves 57 against the force of the return springs 61, with the result that the compressed air is injected with great force from the air injection ports 56 horizontally into the dehydration chamber 17.

At this time, because the rotary shaft 19 is rotating with the crushing member 21, the directions of injection of the compressed air also rotates, spreading the compressed air over the entire circumference of the dehydration chamber 17.

At the initial stage of crushing the first-dehydrated cake 30a, because the first-dehydrated cake 30a is crumbled by the force of the injecting compressed air as well as by the rotating crushing member 21, the rotation or crushing action of the crushing member 21 is aided by the cake crushing action of the compressed air, thus facilitating the initial rotation of the crushing member 21 in the solidified first-dehydrated cake 30a.

Further, the injection of compressed air can crush the first-dehydrated cake 30a into smaller particles than when only the crushing member 21 is used, which in turn destroys more effectively films of coagulative substances to thereby increase the dehydration rate.

Further, when the dehydration chamber 17 is formed in a square shape as described above, there are caused dead corner portions that cannot be reached by the blades 21a, 21b of the crushing member 21. The cake may not be crushed thoroughly at these dead corner portions with the blades 21a, 21b alone. By injecting the compressed air while turning the same as described above, the first-dehydrated cake can be agitated and crumbled throughout the whole circumferential area of the dehydration chamber including the dead corners, thus enhancing the dehydration ratio.

Further, the injection of compressed air crushes the dehydrated cake into small particles and forces air into the gaps among the particles, so that the cake can be cooled satisfactorily by the air passing through it. Hence, when a heated food material, such as bean jam, is to be dehydrated, the bean jam material can be cooled rapidly, thereby preventing growth of putrefying bacteria and early degradation of the quality and taste of the dehydrated material. In the case of medicines, this method can prevent degradation of the quality of nutrient pills, such as vitamin. The compressed air may be at normal temperature but if it is cooled by a cooling device, the cake cooling effect will improve.

After the crushing process, the supply of compressed air is stopped and the second dehydration is performed as in the first embodiment. During the second dehydration, the applied pressure closes the check valves 57 preventing the material from entering the air injection ports 56. After the second dehydration, the operations similar to those of the first embodiment are carried out.

After the operations scheduled for the day are finished, the three-way valve 58 is operated to connect the air introducing pipe 52 to a pressurized water supply means $P_2$ (such as water pump) to deliver pressurized water from the pressurized water supply means $P_2$ to the air introducing pipe 52. Then, the pressurized water flows down the passage 19a of the rotary shaft 19 and strikes the back surfaces of the check valves 57 to open the check valves 57. The pressurized water washes away the materials adhering to the back surfaces of the check valves 57 and the air injection ports 54, 56. The pressurized water spouting from the open check valves 57 also strikes the circumferential inner surface of the dehydration chamber 17 and clears it of the adhering materials.

The first embodiment uses the blades 21a, 21b as the crushing means, and the second embodiment uses the combination of the blades 21a, 21b and the air injection device as the crushing means. It is also possible to construct the crushing means with only the air injection device of the second embodiment without using the blades 21a, 21b of the first embodiment. Even the air injection device alone can crush and cool the dehydrated cake.

It should be noted that the present invention is not limited to the bean jam as the material to be dehydrated by can also be applied to the dehydration or water extraction of other materials including medicines such as nutrient pills.

What is claimed is:

1. A dehydrating method for moist material comprising the steps of:

dehydrating the material into a cake by compression;

releasing the compression and crushing the dehydrated cake; and dehydrating the crushed cake again by compression.

2. A dehydrating method according to claim 1, further comprising a step of cooling the dehydrated cake simultaneously with the crushing step.

3. A dehydrating method according to claim 1, further comprising a step of feeding the material into a dehydration chamber, wherein the dehydration step, the crushing step and the re-dehydration step are performed sequentially in the dehydration chamber.

4. A dehydrating method for moist material comprising the steps of:

dehydrating the material into a cake by compression;

releasing the compression and pouring cooling water over the dehydrated cake; and dehydrating the cake added with the cooling water again by compression.

5. A dehydrating method according to claim 4, further comprising a step of crushing the dehydrated cake simultaneously with the cooling water pouring step.

6. A dehydrating method according to claim 4, further comprising a step of crushing the dehydrated cake after the cooling water pouring step.

7. A dehydrating method according to claim 4, further comprising a step of feeding the material into a dehydration chamber, wherein the dehydration step, the cooling water pouring step and the re-dehydration step are performed sequentially in said dehydration chamber.

8. A dehydrating method according to claim 1, wherein the material is selected from the group consisting of food material and medicine material.

9. A dehydrating method according to claim 4, wherein the material is selected from the group consisting of food material and medicine material.

* * * * *